Feb. 16, 1937.                F. D. MARTIN                 2,070,837
                        POWER TRANSMISSION DEVICE
                          Filed July 27, 1935            2 Sheets-Sheet 1
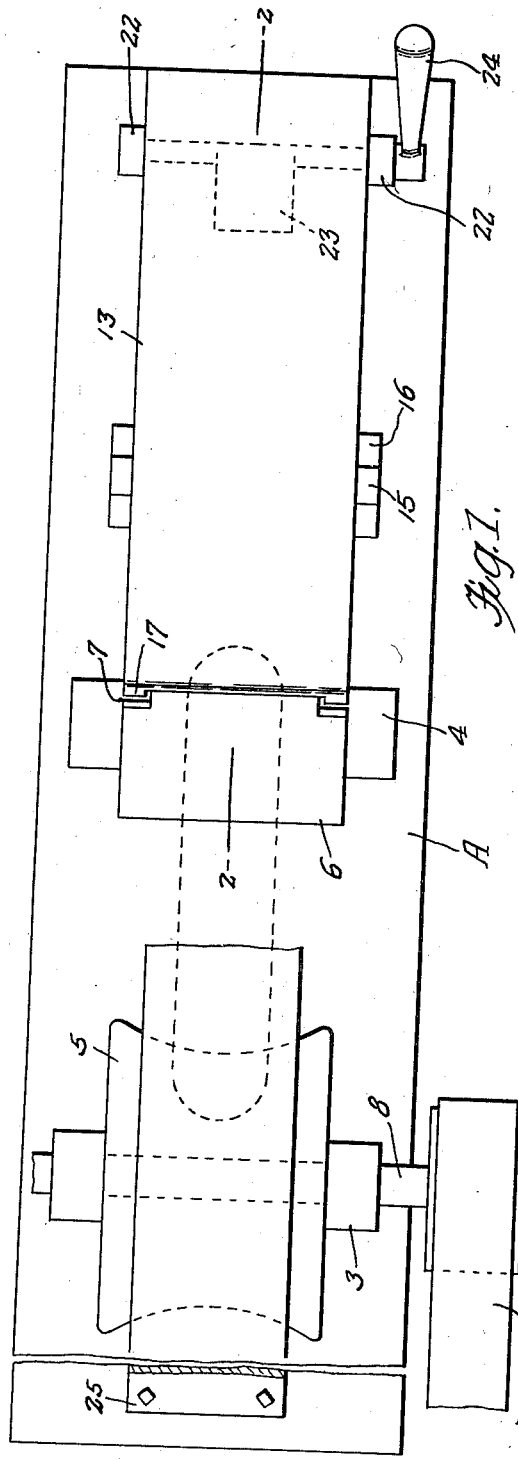
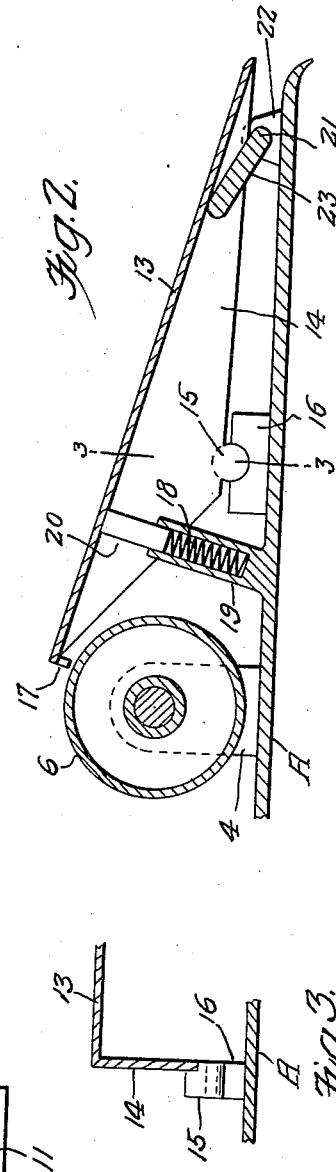
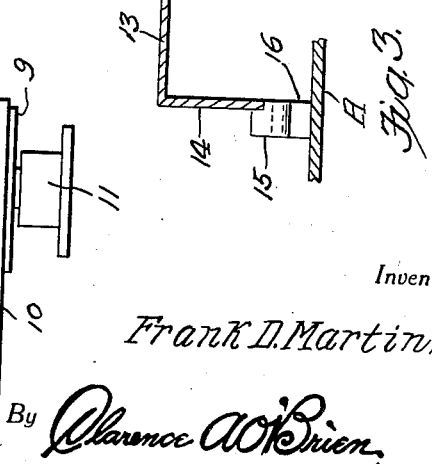
Inventor
Frank D. Martin,
By Clarence A. O'Brien
                    Attorney Feb. 16, 1937.  F. D. MARTIN  2,070,837
POWER TRANSMISSION DEVICE
Filed July 27, 1935  2 Sheets-Sheet 2
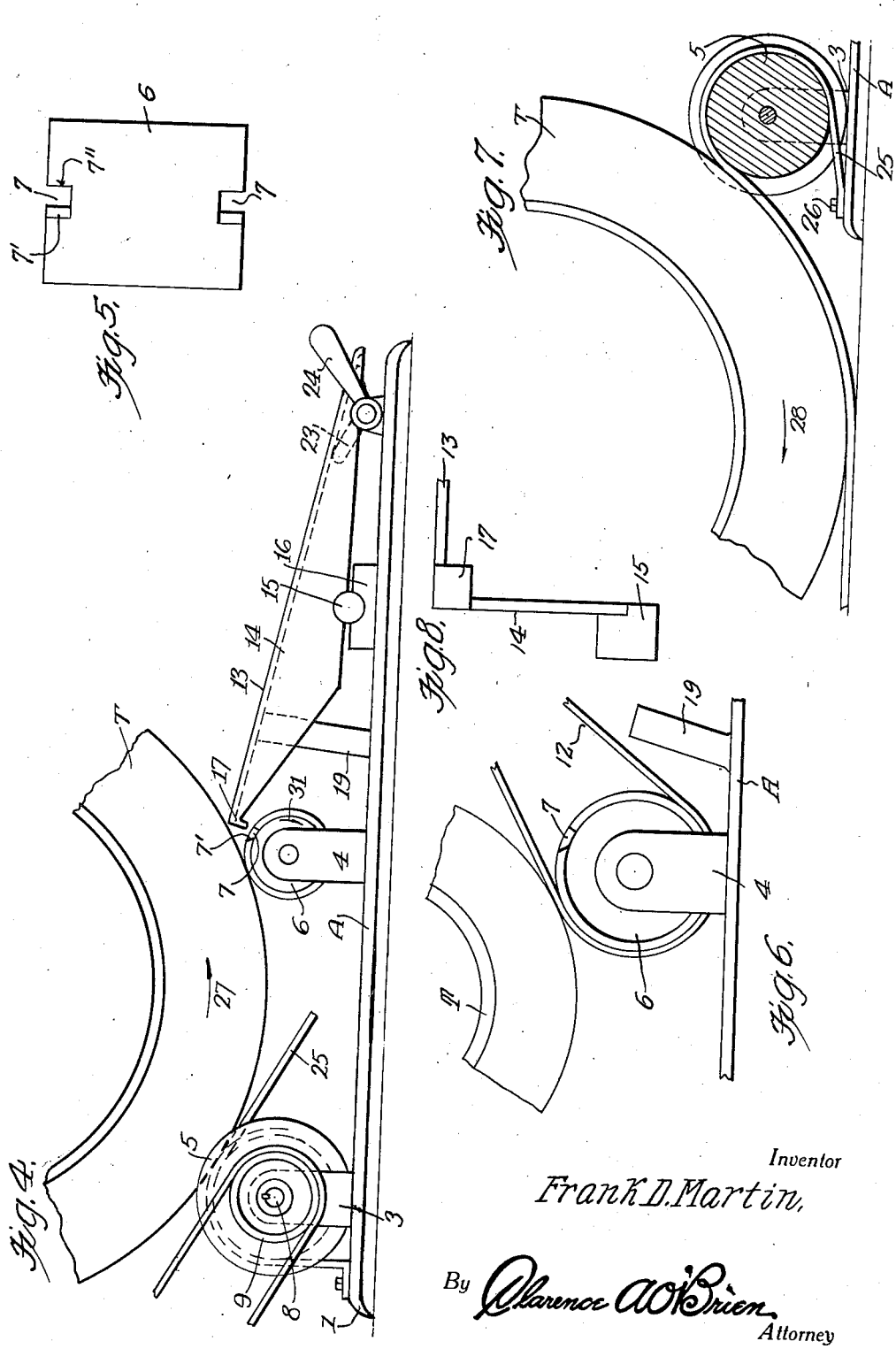
Inventor
Frank D. Martin,
By Clarence A. O'Brien
Attorney Patented Feb. 16, 1937

2,070,837

UNITED STATES PATENT OFFICE 2,070,837

POWER TRANSMISSION DEVICE

Frank D. Martin, Bedford, Ind.

Application July 27, 1935, Serial No. 33,574

1 Claim. (Cl. 74—14)

This invention relates to means for transmitting power from a revolving motor vehicle wheel to another device, the general object of the invention being to provide a pair of rotary members on which the wheels rest and which revolve as the wheel is rotated, with means for transmitting rotary movement of either member to another device and means for facilitating the automobile wheel being placed on the two members or removed therefrom.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a top plan view of the device.

Figure 2 is a section on line 2—2 of Figure 1.

Figure 3 is a section on line 3—3 of Figure 2.

Figure 4 is an elevation of Figure 1.

Figure 5 is a view of the roller.

Figure 6 is a fragmentary elevation showing a belt passing over the roller.

Figure 7 is an elevation with parts in section showing how the strap is used for facilitating the running of the automobile wheel upon the device, the same strap being used for permitting the wheel to run off of the device.

Figure 8 is a fragmentary front view of the tilting platform.

In these drawings the letter A indicates a platform for supporting the parts of the device, the ends of the platform curving downwardly and being beveled as shown at 1 so that these ends will contact the ground and thus hold the platform from moving.

Uprights 3 are carried by the platform adjacent one end thereof and shorter uprights 4 rise from the platform in spaced relation to the uprights 3. A grooved pulley or roller 5 is rotatably supported by the uprights 3 while a cylindrical roller 6 is rotatably supported by the upright 4, the roller being of much less diameter than the pulley and the groove of the pulley is of greater arc than that of the tire T of the automobile wheel which is used to operate the device.

The roller 6 has a slot 7 in the ends thereof (see Figure 5) one end wall of the slot being beveled as shown at 7' and the other radial as shown at 7". The shaft 8 of the pulley 5 is extended to receive a pulley 9 for a belt 10 which leads to another pulley on the shaft of a part to be driven and said extending part of the shaft 8 is formed with a coupling 11 and connected to another coupling of another shaft which can be connected in any suitable manner to a device.

The pulley 9 should be adjustably connected with the shaft so that it can be adjusted on the extension of the shaft 8 so that the belt 10 leading therefrom will not interfere with the fender or other part of an automobile.

A belt 12 can also be placed over the roller 6 to operate a driven member.

A tilted platform 13 is provided for facilitating the placing of automobile wheels upon the pulley and roller and removing the wheel therefrom. This platform is of substantially channel shape in cross section, its side parts 14 gradually increasing in width to a point adjacent the transverse center of the platform 13 but in advance of said center as shown in Figure 4. Each side member 14 is formed with an enlarged roller like part 15 which fits in a semi-circular recess in a bearing block 16 of the platform A so that the platform 13 is supported for rocking movement. The front end or the end adjacent the roller 6 of the platform is formed with the projections 17 to engage the slots 7 of the roller 6 with the platform 13 tilted in said direction. The platform is normally held against this tilting action by one or more springs 18 placed in a diagonal socket 19 carried by the base A and receiving a projection 20 depending from the platform 13.

A shaft 21 is journalled in the upright 22 at the outer end of the platform A and said shaft carries a cam 23 and a handle 24 so that by rocking the shaft by the handle the cam can be raised to tilt the platform to cause the projections 17 to engage the slots 7 to hold the roller 6 against rotary movement and by moving the same in an opposite direction the cam will be lowered so that the spring 18 will raise the platform to its normal position with the projections 17 out of the slots 7 as shown in Figure 4. This platform 13 could be readily removed when it is desired to use the belt 12, shown in Figure 6 and it will be understood that this platform is used to run the automobile wheel upon the device and permitting the wheels to be run off the device. When driving on platform 13, cam 23 is in its neutral position permitting platform 13 to rock far enough to permit the projections 17 to engage or disengage in slots 7 of roller 6. It can readily be seen that when the tire passes the center of platform 13 while traveling in the direction as indicated by arrows 30, the platform 13 will tilt causing projections 17 to engage in slots 7 thereby locking roller 6 in a fixed position. After the wheel has passed on roller 6, the turning of the roller in the direction as indicated by arrows 31, causes bevel edge 7' of slots 7 to lift projections 17 thereby throwing the platform 13 free of the roller and allowing the roller to turn with the wheel.

When it is desired to back the automobile off the device, cam 23 is turned to its raised position by the aid of handle 24. When the cam is turned to its raised position while the automobile wheel is turning roller 6 in the opposite direction as indicated by arrows 31, square shoulders 7" of slots 7 will engage with square shoulders of the projections 17 and thus lock roller 6 in a fixed and firm position.

I also provide a strap 25 for facilitating placing the wheel on the device or its removal therefrom. This strap has one end fastened to the platform A as shown at 26 and when the wheel is to be run off the device from that end of the platform where large pulley 5 is located the strap is placed over the pulley 5 as shown in Figure 4 with the wheel bearing thereon so that when the wheel is turned in the direction of the arrow 27 of Figure 4 the belt and strap 25 will cause the wheel to ride up the pulley 5 to then roll off of the device. When the wheel is to be placed on the device from that end of the platform where the large pulley 5 is located it is run on the strap 25 which is placed around the pulley 5 as shown in Figure 7 and the wheel turned in the direction of the arrow 28 in Figure 7 and thus the wheel will climb up the strap 25 and over the pulley 5 onto the device. The periphery of pulley 5 is concave so as to provide a greater area of traction between the wheel and pulley than would ordinarily result from making the periphery flat. The periphery of roller 6 inwardly of slits 7 is flat. When a power transmission belt 12 is attached to roller 6, a segment of the automobile wheel rests on the belt and holds it firmly against the periphery of the roller which results in an increased traction between the roller and belt.

It is though from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:

In a power take-off device comprising a platform adapted to rest in stationary position on the ground, traction wheels supported in elevated spaced relation on the platform so that different parts of an automobile wheel shall bear upon them, a power transmission belt connected with one of the traction wheels, and a flexible ramp secured at one end only to the platform below the level of the traction wheels having an intermediate portion trained about a segment of one of the traction wheels whereby the traction wheel is locked when the automobile wheel holds the flexible ramp against the traction wheel while going on or coming off the traction wheels.

FRANK D. MARTIN.